C. D. MURDOCK.
METHOD OF FLANGING PIPES.
APPLICATION FILED NOV. 4, 1908.
940,702.
Patented Nov. 23, 1909.
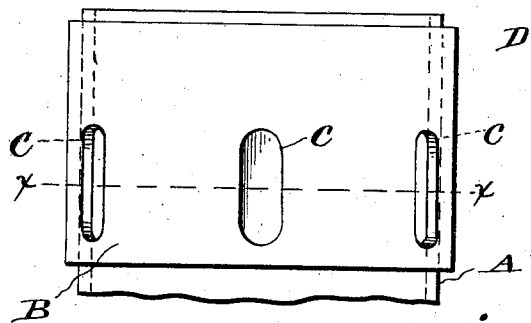
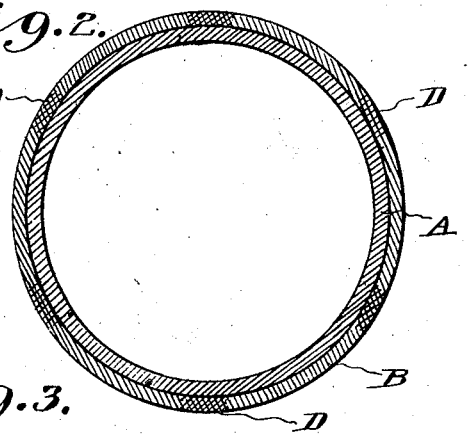
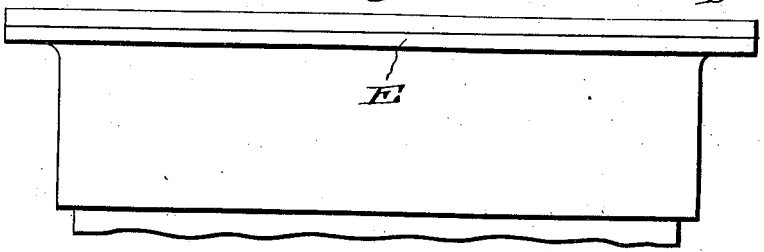
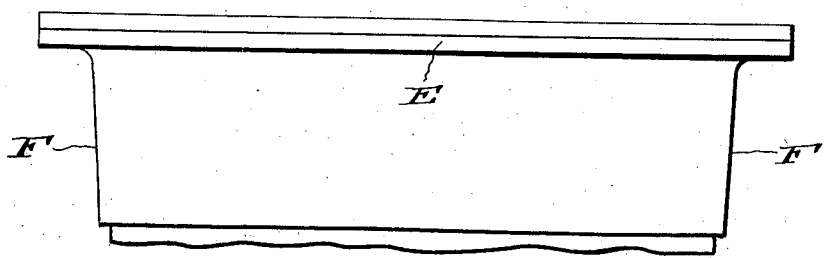
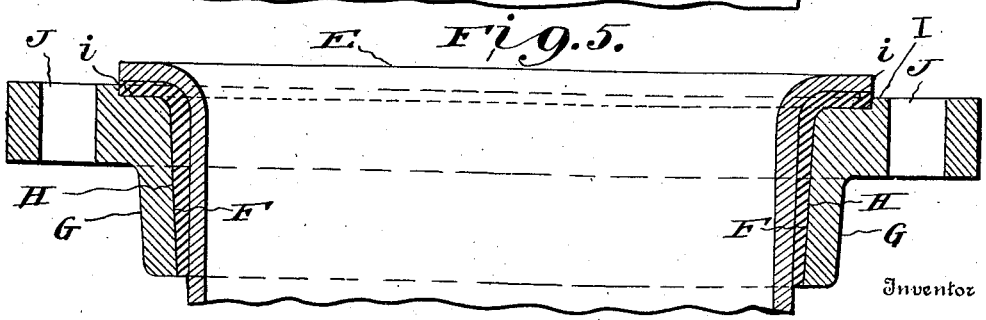

UNITED STATES PATENT OFFICE.

CHARLES D. MURDOCK, OF PHILADELPHIA, PENNSYLVANIA.

METHOD OF FLANGING PIPES.

940,702.

Specification of Letters Patent.   Patented Nov. 23, 1909.

Application filed November 4, 1908. Serial No. 461,085.

*To all whom it may concern:*

Be it known that I, CHARLES D. MURDOCK, a citizen of the United States, residing at Philadelphia, in the county of Philadelphia and State of Pennsylvania, have invented certain new and useful Improvements in Methods of Flanging Pipes, of which the following is a specification.

My invention relates to the methods of flanging pipes of wrought iron, steel and other yielding material and has for its object the provision of a process employing the securing of a collar or sleeve of wrought iron, steel or other yielding material to the end of the pipe before flanging it so as to reinforce and strengthen the flange, said collar being provided with holes through which the surface of the pipe and the edges of the holes are fused so as to weld the sleeve to the pipe before flanging.

My improved method will be described in detail hereinafter and illustrated in the accompanying drawings in which—

Figure 1 is a view in elevation showing a fragment of a pipe with the sleeve in position thereon, the first step in my method, Fig. 2, a cross section on the line $x$—$x$ of Fig. 1 showing the second step in my method, the welding of the sleeve to the pipe through the holes in the sleeve, Fig. 3, a view in elevation of a fragment of the pipe and of the sleeve showing the third step in my method, flanging the pipe and sleeve, Fig. 4, a similar view showing the fourth step of the method finishing the flange and surface of the sleeve, and Fig. 5, a longitudinal sectional view of a fragment of the flanged pipe showing the securing ring in position thereon.

In the drawings similar reference characters will indicate corresponding parts in the several views.

In my improved method I take a pipe A of wrought iron, steel or any other yielding material to be flanged and slip over its end a sleeve B, the sleeve being heated so as to expand it, and, after being placed, the ring B is chilled so as to shrink it into position on the pipe. Before being placed on the pipe A the sleeve B is provided with any number of holes C of any shape or size desired so that when it is in position on the pipe as stated and as shown in Fig. 1 the surface of the pipe is exposed through said holes. I then take any suitable welding apparatus, such as an oxy-acetylene flame, or an electric welding apparatus, and melt or fuse the edges of the holes C and the surface of the pipe A exposed through said holes. When the parts are thoroughly melted I then fill the hole with iron, steel or other fusible metal in a molten state by holding a bar of the metal in contact with the oxy-acetylene flame, the carbon point of an electric welder or other suitable welding apparatus. When the parts have cooled it will be understood that the sleeve and pipe will be effectually joined at the places where welded as just described and shown at D in Fig. 2.

It will be understood that the sleeve may be secured on the pipe by heating the end of the pipe and the sleeve to a welding heat in any convenient form of furnace and then hammering the pipe and sleeve to weld them together, but welding through the holes C as above described is just as effective in securing the sleeve on the pipe and the expense incident to the operation much less.

After the pipe and sleeve have been welded together as described, the end of the pipe and the sleeve are then heated in a fire or furnace or other apparatus to nearly a welding heat and their edges turned in any suitable manner so as to form a flange E thereon as shown in Fig. 3, the turned edges of the pipe and sleeve being thoroughly rolled so as to make the flange E, described, homogeneous.

The surface of the flange E and the sleeve are then ground down in any suitable manner so as to give it a smooth finish and the surface of the sleeve B abutting the flange E beveled as shown at F in Fig. 4.

In securing the ends of the pipes together a ring G is employed at each end of the pipe having its inner surface ground and beveled as shown at H, to fit the beveled surface F of the welded on sleeve B and with a flange I formed with or without a recess $i$ to engage the flange E, the rings on the adjacent ends of two pipes being secured together by bolts secured through holes J in the rings. In Fig. 5 is shown the end of a flanged pipe with a ring G in position.

By forming the sleeve B with the beveled surface F and the ring G with a corresponding beveled surface H, the ring G will bind tightly against the sleeve when drawn into position to secure the two ends of pipes A together as described and the strain due to pressure, expansion or any other cause is equally divided over the whole bearing surface and the back of the flange E so that no undue or unequal strain occurs at any point.

In practice the rings G must be slipped on the pipe A before the sleeve B is placed thereon so as to be in position to slip on to the end of the pipe as shown in Fig. 5.

By my method it will be understood that the flange E has the same strength as would a flange formed on a pipe of the same thickness as the combined thicknesses of the pipe A and sleeve B without the use of the extra thickness of metal throughout the length of the pipe where not needed

Having thus described my invention what I claim is—

1. The method of flanging pipes which consists in securing a sleeve on the pipe, and then bending the pipe and sleeve to form the flange.

2. The method of flanging pipes which consists in shrinking a sleeve onto the pipe, and then bending the pipe and sleeve to form the flange.

3. The method of flanging pipes which consists in welding a sleeve onto the pipe, and then bending the pipe and sleeve to form the flange.

In testimony whereof I hereto affix my signature in the presence of two witnesses.

CHARLES D. MURDOCK.

Witnesses:
CHARLES H. WHITNEY,
PAUL E. ZAHN.